US006639426B2

(12) United States Patent  
Haycock et al.

(10) Patent No.: US 6,639,426 B2  
(45) Date of Patent: Oct. 28, 2003

(54) APPARATUS FOR TESTING SIMULTANEOUS BI-DIRECTIONAL I/O CIRCUITS

(75) Inventors: Matthew B. Haycock, Beaverton, OR (US); Stephen R. Mooney, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 10/046,448

(22) Filed: Oct. 29, 2001

(65) Prior Publication Data

US 2002/0079926 A1 Jun. 27, 2002

Related U.S. Application Data

(62) Division of application No. 09/605,479, filed on Jun. 28, 2000, now Pat. No. 6,348,811.

(51) Int. Cl.⁷ .............................................. H03K 19/00
(52) U.S. Cl. ........................... 326/82; 326/16; 326/38
(58) Field of Search ............................. 326/16, 30, 82, 326/83, 86, 37–41

(56) References Cited

U.S. PATENT DOCUMENTS

| 5,128,962 | A | 7/1992 | Kerslake et al. ............ 345/7 |
| 5,164,960 | A | 11/1992 | Winen et al. ................ 375/10 |
| 5,479,652 | A | 12/1995 | Dreyer et al. ........ 395/183.06 |
| 5,541,535 | A | 7/1996 | Cao et al. .................... 326/83 |
| 5,568,064 | A | 10/1996 | Beers et al. ................. 326/31 |
| 5,604,450 | A | 2/1997 | Borkar et al. ............... 326/82 |
| 5,641,931 | A | 6/1997 | Ogai et al. ................... 84/661 |
| 5,666,302 | A | 9/1997 | Tanaka et al. ............. 364/825 |
| 5,905,391 | A | 5/1999 | Mooney ...................... 327/161 |
| 6,040,714 | A | 3/2000 | Klein ............................ 326/86 |
| 6,073,151 | A | 6/2000 | Baker et al. ................ 708/290 |
| 6,150,862 | A | 11/2000 | Vikinski ..................... 327/262 |
| 6,239,642 | B1 | 5/2001 | Kim et al. .................. 327/276 |

FOREIGN PATENT DOCUMENTS

JP          05-129908         5/1993     ........... H03K/5/13

OTHER PUBLICATIONS

Haycock, M., et al., "A 2.5Gb/s Bidirectional Signaling Technology", *Hot Interconnects Symposium V*, pp. 1–8, (Aug. 1997).

*Primary Examiner*—Don Le  
(74) *Attorney, Agent, or Firm*—Schwegman, Lundberg, Woessner & Kluth, P.A.

(57) ABSTRACT

A simultaneous bi-directional I/O circuit includes a first MUX in the reference select circuitry and a second, matching MUX in the pre-driver stage of the output buffer. In normal mode, the first MUX passes the driven data output signal, which controls the threshold of the differential receiver circuit between two different non-zero voltage levels, so that the receiver circuit can properly decode an incoming signal at the I/O node or pin. In an AC switching state or loopback test mode, the first MUX de-selects the driven data output signal from controlling the receiver circuit. This allows the receiver circuit to decode outgoing data that is being looped back as incoming data. The second MUX enables the reference select circuitry to switch at a rate that matches the output slew rate in order to provide high-speed operation. Also described are an electronic system, a data processing system, and various methods of testing simultaneous bi-directional I/O circuits.

16 Claims, 8 Drawing Sheets

APPARATUS FOR TESTING SIMULTANEOUS BI-DIRECTIONAL I/O CIRCUITS

This application is a divisional of application U.S. Ser. No. 09/605,479, filed on Jun. 28, 2000 now U.S. Pat. No. 6,348,811.

RELATED INVENTIONS

The present invention is related to the following inventions which are assigned to the same assignee as the present invention:

(1) Ser. No. 09/470,091, filed Dec. 21, 1999, entitled "Method and Apparatus to Structurally Detect Random Defects That Impact AC I/O Timings in an Input/Output Buffer";

(2) Ser. No. 09/474,874, filed Dec. 29, 1999, entitled "Method and Apparatus for Conducting Input/Output Loop Back Tests Using a Local Pattern Generator and Delay Elements";

(3) Ser. No. 09/605,624, filed Jun. 28, 2000, entitled "Digital Variable Delay Circuit Having Voltage-Mixing Interpolator and Methods of Testing Input/Output Buffers Using Same"; and (4) Ser. No. 09/605,459, filed Jun. 28, 2000, entitled "Symmetric, Voltage-controlled CMOS Delay Cell With Closed-Loop Replica Bias".

TECHNICAL FIELD OF THE INVENTION

The present invention relates generally to integrated circuits. More particularly, the present invention relates to apparatus and methods for testing simultaneous bi-directional I/O circuits.

BACKGROUND OF THE INVENTION

Integrated circuits (ICs) typically contain one or more functional logic blocks (FLB), such as a microprocessor, microcontroller, graphics processor, bus interface circuit, input/output (I/O) circuit, memory circuit, and the like. IC's are typically assembled into packages that are physically and electrically coupled to a substrate such as a printed circuit board (PCB) or a ceramic substrate to form an "electronic assembly". The "electronic assembly" can be part of an "electronic system". An "electronic system" is broadly defined herein as any product comprising an "electronic assembly". Examples of electronic systems include computers (e.g., desktop, laptop, hand-held, server, etc.), wireless communications devices (e.g., cellular phones, cordless phones, pagers, etc.), computer-related peripherals (e.g., printers, scanners, monitors, etc.), entertainment devices (e.g., televisions, radios, stereos, tape and compact disc players, video cassette recorders, MP3 (Motion Picture Experts Group, Audio Layer 3) players, etc.), and the like.

In the field of electronic systems there is an incessant competitive pressure among manufacturers to drive the performance of their equipment up while driving down production costs. This is particularly true regarding the testing of ICs, where each new generation of IC's must provide increased performance while generally being smaller or more compact in size. IC's must generally be tested before they are incorporated into an electronic assembly in order to verify that each component of each FLB on the IC functions properly and to verify that the input/output (I/O) circuits of each IC operate correctly within specified timing parameters or timing margins.

FIG. 1 illustrates a block diagram of a prior art I/O circuit when outputting data. The I/O circuit comprises a driver circuit 1 and a receiver circuit 2. When the I/O circuit is outputting data, driver circuit 1 is enabled by output enable (OE) signal=1, and driver circuit 1 generates a data-out signal over path 3 to the circuit's I/O node or pin.

FIG. 2 illustrates a block diagram of a prior art I/O circuit when inputting data. When the I/O circuit is receiving data, driver circuit 1 is disabled by OE=0, and receiver circuit 2 receives a data-in signal over path 4 from the circuit's I/O node.

In testing IC's, it is known to employ I/O loopback or switching state (AC) testing, as for example disclosed in Related Inventions Nos. 1 and 2 above. In I/O loopback testing, data is generated by a FLB within the IC and output through the driver or output component of each I/O circuit. Subsequently, the data is received through the receiver or input component of each I/O circuit and conveyed to the FLB to verify that the correct data has been received. In this manner, the IC can verify that the input and output components of each I/O buffer are correctly operating.

FIG. 3 illustrates a block diagram of a prior art I/O circuit operating in a loopback test mode. Driver circuit 1 is enabled by OE=1 and generates data over path 5 that is fed back to the input of receiver 2. Operating the I/O circuit in this manner enables a form of built-in self-test to be performed.

In known prior art I/O loopback testing, the I/O circuit being tested could not operate in native mode (i.e., functioning in the same mode as it would in normal operation). In normal operation, the driver of a conventional I/O circuit is enabled when the I/O circuit is sending data and disabled when the I/O circuit is receiving data. However, in loopback test mode the I/O circuit is forced into a non-native mode of operation, because the driver is enabled while the receiver is receiving. It would be desirable to be able to perform loopback testing on I/O circuits while operating in native mode.

It is known to use simultaneous bi-directional (SBD) I/O circuits in IC's. For example, U.S. Pat. No. 5,604,450 of Shekhar Borkar et al., which is assigned to the assignee of the present invention, discloses SBD I/O circuits.

FIG. 4 illustrates a block diagram of a prior art simultaneous bi-directional I/O circuit. SBD I/O circuit comprises a driver 6, a differential receiver 7, and a selection circuit 8 such as a multiplexer (MUX). The selection circuit 8 is controlled by the state of the data-out signal (OUT) going into driver 6 and applied via path 10 to a control input of selection logic 8. Two non-zero reference voltages, e.g. ¼ Vcc and ¾ Vcc, are applied as inputs to selection logic 8. Selection logic 8 passes a REF voltage level representing one or the other of these reference voltages, depending upon the state of the data-out signal OUT at its control input.

In the SBD form of signaling, the threshold of the differential receiver is adaptively changed between two non-zero reference voltages, e.g. ¼ Vcc and ¾ Vcc, depending on whether the data being driven out of the I/O circuit's I/O node is low or high. Switching the reference level to the receiver in this manner enables the receiver to properly decode the incoming data from the ternary voltage level on the I/O node.

In order to test whether SBD I/O circuits are operating properly, it is desirable to be able to employ a loopback test mode similar to that illustrated in FIG. 3 for non-SBD I/O circuits. However, high-speed operation of an SBD I/O circuit requires precise delay matching between the data path 9 and reference select path 10 to the receiver 7. In addition, high-speed operation also requires that the reference select circuitry switches at a rate that matches the I/O circuit's output slew rate.

For the reasons stated above, and for other reasons stated below which will become apparent to those skilled in the art upon reading and understanding the present specification, there is a significant need in the art for an SBD I/O circuit that can be tested in a loopback testing mode that does not disturb the delay-matching or slew-rate matching circuitry of the I/O circuit, and for methods of native-mode testing such I/O circuits on IC's.

DETAILED DESCRIPTION OF EMBODIMENTS OF THE INVENTION

In the following detailed description of embodiments of the invention, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present invention is defined only by the appended claims.

The present invention provides methods of performing loopback testing of integrated circuits that comprise SBD I/O circuits. Various embodiments are illustrated and described herein. In one embodiment, an SBD I/O circuit comprises a first MUX in the reference select circuitry and a second, matching MUX in the pre-driver stage of the output buffer. In normal mode, the first MUX passes the driven data output signal, which controls the threshold of the differential receiver circuit between two different non-zero voltage levels, so that the receiver circuit can properly decode an incoming signal at the I/O node. In an AC switching state or loopback test mode, the first MUX de-selects the driven data output signal from controlling the receiver circuit. This allows the receiver circuit to decode outgoing data that is being looped back as incoming data. The second MUX enables the reference select circuitry to switch at a rate that matches the output slew rate in order to provide high-speed operation.

Figure 1:
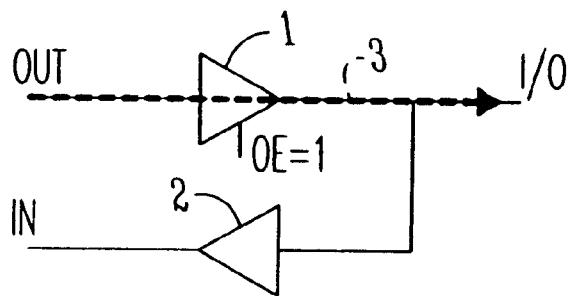
FIG. 1 illustrates a block diagram of a prior art I/O circuit when outputting data.
Figure 2:
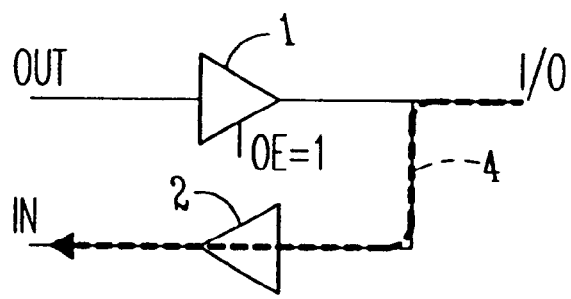
FIG. 2 illustrates a block diagram of a prior art I/O circuit when inputting data.
Figure 3:
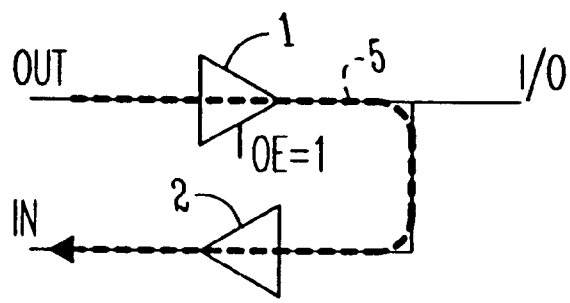
FIG. 3 illustrates a block diagram of a prior art I/O circuit operating in a loopback test mode.
Figure 4:
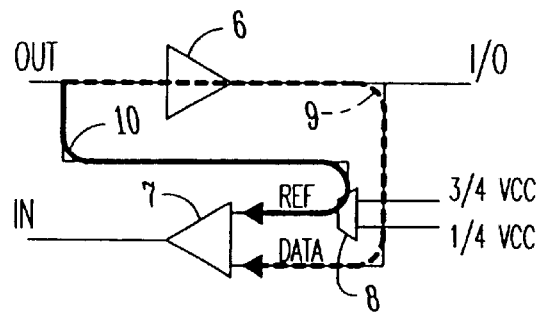
FIG. 4 illustrates a block diagram of a prior art simultaneous bi-directional I/O circuit.
Figure 5:
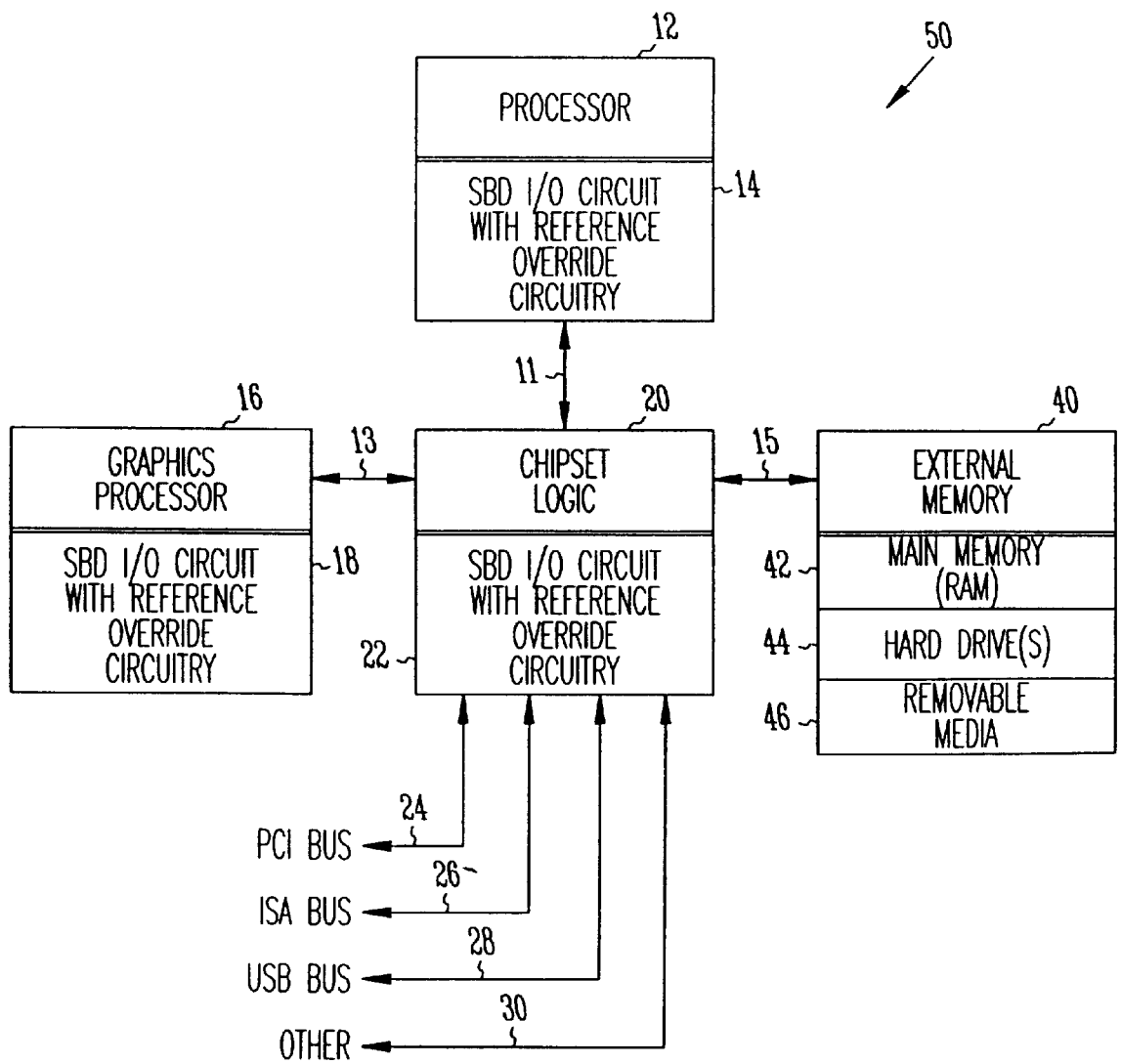
FIG. 5 illustrates a block diagram of an electronic system incorporating at least one simultaneous bi-directional I/O circuit with reference override circuitry, in accordance with one embodiment of the invention.

FIG. 5 illustrates a block diagram of an electronic system 50 incorporating at least one simultaneous bi-directional I/O circuit with reference override circuitry, in accordance with one embodiment of the invention. In the example shown, electronic system 50 is a data processing system that comprises a plurality of components, including processor 12, a graphics processor 16, chipset logic 20, and external memory 40. These components are coupled to one or more busses 11, 13, and 15. Other components (not illustrated) can be included in the data processing system, such as a keyboard, cursor control, display monitor, modem, printer, scanner, speaker, game controller, sensor, actuator, and so forth.

As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), or any other type of processor or processing circuit.

Chipset logic 20 can be any one or more supporting circuits that couple processor 12 to external devices. For example, chipset logic 20 can include input/output (I/O) circuits, bus circuits, debug circuits, node control circuits, port switching circuits, memory controller circuits, and so forth.

In one embodiment, chipset logic 20 provides interfaces to various internal and external busses, such as a PCI bus 24, an ISA bus 26, and a USB bus 28. Chipset logic 20 can also provide an interface to any other desired bus, functional logic block (FLB), IC, or external device such as external memory 40, a network circuit, or the like via I/O line 30. It will be understood that external memory 40 could also be coupled to chipset logic 20 via one of bus I/O lines 24, 26, or 28.

External memory 40 can include main memory 42 in the form of random access memory (RAM), one or more hard drives(s) 44, and removable media 46 such as diskettes, compact disks (CD's), digital video disks (DVD's), and the like.

Processor 12, graphics processor 16, chipset logic 20, and RAM 42 can all be implemented on ICs. In the example shown in FIG. 5, chipset logic 20 comprises at least one IC that includes, in addition to other circuits, at least one SBD I/O circuit with reference override circuitry 22, in accordance with the present invention, as will be explained in further detail below. Chipset logic 20 can comprise a plurality of IC's in other embodiments, and normally each IC of the chipset logic 20 will include at least one SBD I/O circuit with reference override circuitry of the type described herein.

Processor 12 is an integrated circuit comprising, in addition to other circuits, at least one SBD I/O circuit with reference override circuitry 14, in accordance with the present invention. Likewise, graphics processor 16 is an integrated circuit comprising, in addition to other circuits, at least one SBD I/O circuit with reference override circuitry 16, in accordance with the present invention. Other integrated circuits in the electronic system 50 can optionally comprise at least one SBD I/O circuit with reference override circuitry, if it is desired to achieve the advantages provided by the present invention. The ICs in electronic system 50 will normally contain many SBD I/O circuits, each of which may comprise reference override circuitry as disclosed herein.

The present invention, however, is not to be construed as limited to any particular architecture or combination of functional elements or ICs. Its use is extremely flexible, being readily adaptable to any electronic system 50 in which its advantages are desired to be achieved. Electronic system 50 is merely one example of an electronic system in which the present invention can be used. Other types of electronic systems with which the present invention can be used include communications equipment, such as Internet computers, cellular telephones, pagers, and two-way radios; entertainment systems; process control systems; aerospace equipment; automotive equipment; and similar electronic systems.

Each of the major elements depicted in the electronic system 50 of FIG. 5 can comprise one or more functional logic blocks (FLB's). The SBD I/O circuit with reference override circuitry of the present invention is typically used on FLB's that contain I/O buffer circuits that communicate with other off-chip FLB's, but its use is not limited to such FLB's, and it can be used to communicate with on-chip FLB's, for example.

Figure 6:
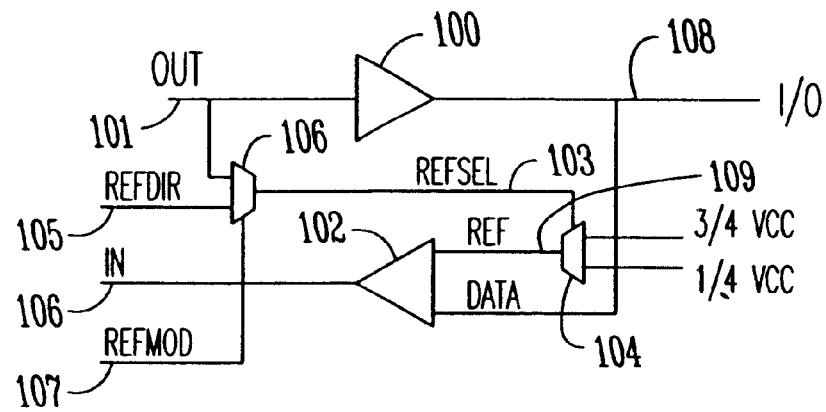
FIG. 6 illustrates a block diagram of a simultaneous bi-directional I/O circuit with reference override circuitry, in accordance with one embodiment of the invention.

FIG. 6 illustrates a block diagram of a simultaneous bi-directional I/O circuit with reference override circuitry, in accordance with one embodiment of the invention. In order to provide I/O loopback or switching state (AC) testing on an SBD I/O circuit, it is necessary to override or decouple the reference select circuitry without disturbing the delay matching or slew-rate matching circuitry in the SBD I/O circuit.

The SBD I/O circuit shown in FIG. 6 comprises a driver 100, a differential receiver 102, and a reference select circuit that includes a selection circuit 104 such as a multiplexer (MUX) 104 together with its associated input, control, and output signals. Driver 100 receives an OUT signal as an input, and it generates a data-out signal to I/O node 108. MUX 104 passes either a ¼ Vcc reference voltage or a ¾ Vcc reference voltage in the form of a REF voltage, depending upon the state of a REFSEL signal applied to its control terminal. Differential receiver 102 receives the REF voltage and a DATA input at I/O node 108, and it passes a data-in signal IN over line 106.

As shown in FIG. 6, an additional selection circuit, such as a multiplexer (MUX) 106 is provided in the reference select path between the data-out line (OUT) 101 and the REFSEL line 103. MUX 106 receives as inputs to its two input terminals the OUT signal on line 101 and a REFDIR signal on line 105, and it passes one or the other as a REFSEL signal from its output terminal to line 103, depending upon the logic state of a REFMOD signal on line 107 at its control terminal. As mentioned above, the REFSEL signal is applied to the control terminal of MUX 104.

When it is desired to operate the SBD I/O circuit of FIG. 6 in normal mode, the binary state of REFMOD is appropriately set to allow MUX 106 to pass the OUT signal and not to pass the REFDIR signal. Accordingly, MUX 104 is controlled by the state of the data-out signal (OUT) being driven by driver 100, and MUX 104 passes a REF voltage level representing either of the ¼ Vcc or ¾ Vcc reference voltages, depending upon the state of the REFSEL signal at its control input.

When it is desired to operate the SBD I/O circuit of FIG. 6 in loopback test mode, the binary state of REFMOD is appropriately set to allow MUX 106 to pass the REFDIR signal and not to pass the OUT signal. Accordingly, MUX 104 is controlled solely by the state of the REFDIR signal, and MUX 104 passes a REF voltage level representing either of the ¼ Vcc or ¾ Vcc reference voltages, depending upon the state of the REFSEL signal at its control input. In this mode, MUX 104 is not controlled by the state of the data-out signal (OUT) being driven by driver 100.

The SBD I/O circuit of FIG. 6 operates in native mode whether it is operating in its normal mode or it is operating in loopback test mode.

Figure 7:
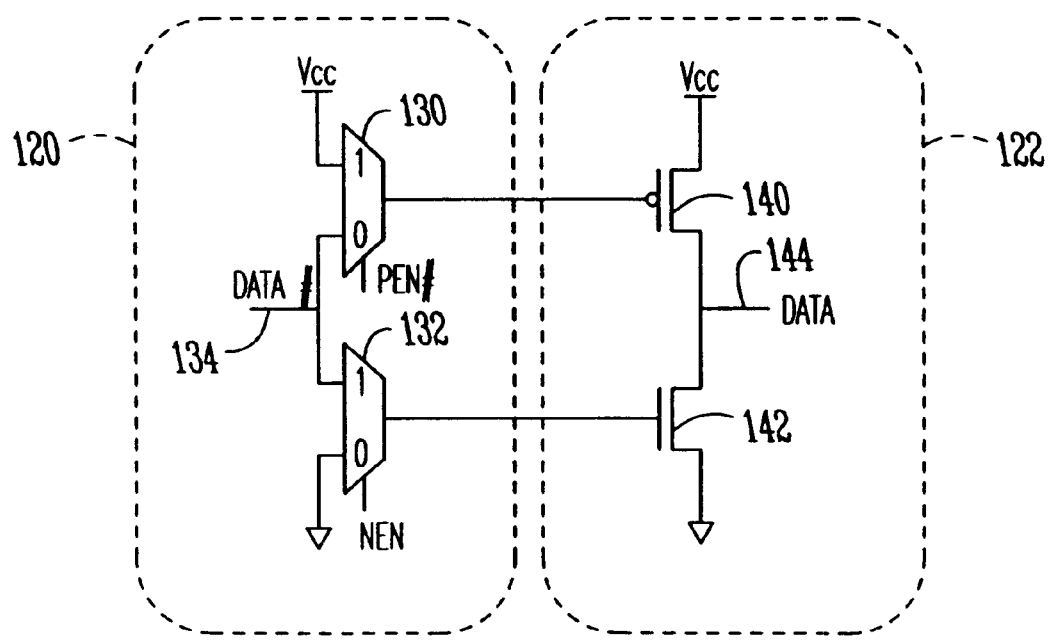
FIG. 7 illustrates a combination block diagram and circuit diagram of a driver circuit of a simultaneous bi-directional I/O circuit with reference override circuitry, in accordance with one embodiment of the invention.

FIG. 7 illustrates a combination block diagram and circuit diagram of a driver circuit of a simultaneous bi-directional I/O circuit with reference override circuitry, in accordance with one embodiment of the invention. The driver circuit 122 comprises a p-type gate 140 and an n-type gate 142. A data-out signal (DATA) is generated at node 144 to which are coupled the source terminal of gate 140 and the drain terminal of gate 142.

Driver circuit 122 also comprises a pre-driver circuit 120. Pre-driver circuit 120 comprises a first selection circuit 130 and a second selection circuit 132, which in one embodiment are implemented as MUX's. MUX 130 has a control terminal to which the inverse of a P-enable control signal (represented by PEN#) is applied. MUX 132 has a control terminal to which an N-enable control signal NEN is applied.

When control signal PEN# is in one binary state, MUX 130 passes Vcc, and when PEN# is in the complementary binary state, MUX 130 passes a DATA# signal (i.e., the inverse of a DATA signal). When control signal NEN is in one binary state, MUX 132 passes the DATA# signal, and when NEN is in the complementary binary state, MUX 132 passes Vss.

MUX's 130 and 132 are provided in the data path to match or equalize the delay contributed by MUX 106 (FIG. 6) in the reference select path, so that the delay path through driver 100 is substantially equal to the delay path through the override circuit and the reference select circuitry. This enables the reference select circuitry to switch at a rate that matches the I/O circuit's output slew rate.

Only one or the other of MUX 130 or MUX 132 is operative in the data path at one time. MUX 130 is in play and providing the delay-matching when the output signal (OUT, FIG. 6) is switching low to high, and MUX 132 is in play and providing the delay-matching when the output signal is switching high to low.

Figure 8:
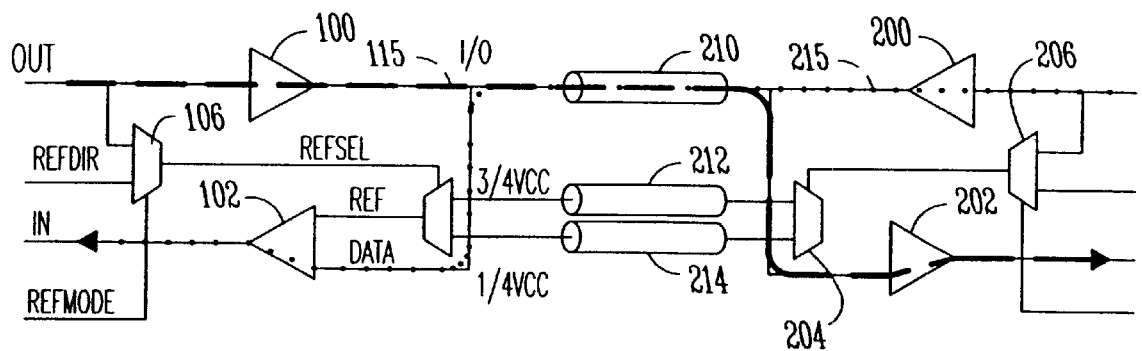
FIG. 8 illustrates a pair of simultaneous bi-directional I/O circuits coupled in a normal loopback test mode, in accordance with one embodiment of the invention.

FIG. 8 illustrates a pair of simultaneous bi-directional I/O circuits coupled in a normal loopback test mode, in accordance with one embodiment of the invention. In this test configuration, a pair of SBD I/O circuits is illustrated. Each can be of identical construction to that illustrated in FIG. 6. A first SBD I/O circuit comprises driver 100, differential receiver 102, and MUX 106. A second SBD I/O circuit comprises driver 200, differential receiver 202, and MUX 206.

An I/O node of the first SBD I/O circuit is coupled via an impedance-matched connection 210 to the corresponding I/O node of the second SBD I/O circuit. The ¾ Vcc reference terminal of the first SBD I/O circuit is also coupled to the corresponding node of the second SBD I/O circuit via an impedance-matched connection 212. In addition, the ¼ Vcc reference terminal of the first SBD I/O circuit is also coupled to the corresponding node of the second SBD I/O circuit via an impedance-matched connection 214. Impedance-matched connections 210, 212, and 214 can be of any suitable type such as transmission lines.

In normal loopback test mode, test data can be transmitted and received simultaneously by each SBD I/O circuit in order to confirm that the internal circuitry of each I/O circuit is functioning properly. This is illustrated schematically by data being sent by the SBD I/O circuit on the left-hand side of FIG. 8 and simultaneously received by the SBD I/O circuit on the right-hand side of FIG. 8 via path 115, while the circuit on the right-hand side is simultaneously sending data that is being simultaneously received by the circuit on the left-hand side via path 215. The reference override circuitry shown in the embodiment illustrated in FIG. 6 is not used in this test mode, since this is not a loopback test.

Figure 9:
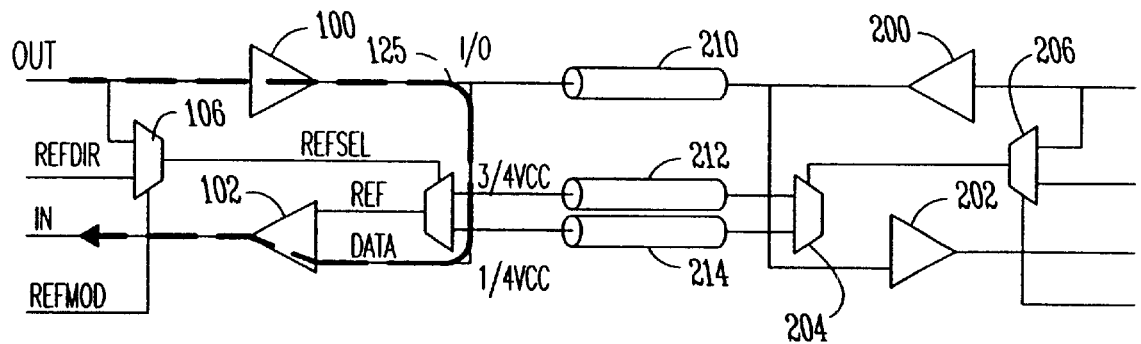
FIG. 9 illustrates a pair of simultaneous bi-directional I/O circuits coupled in a single-pin loopback test mode, in accordance with one embodiment of the invention.

FIG. 9 illustrates a pair of simultaneous bi-directional I/O circuits coupled in a single-pin loopback test mode, in accordance with one embodiment of the invention. This test configuration is identical to that illustrated in FIG. 8. However, data is only sent and received by one I/O circuit at a time. This is illustrated schematically by data being sent by the SBD I/O circuit on the left-hand side of FIG. 9 and looped back and simultaneously received by the same I/O circuit via path 125.

The SBD I/O circuit on the right-hand side of FIG. 9 is required to provide an impedance-matched static termination to either Vcc or Vss. This test mode utilizes the reference override circuitry shown in the embodiment illustrated in FIG. 6, since this is a loopback test.

Figure 10:
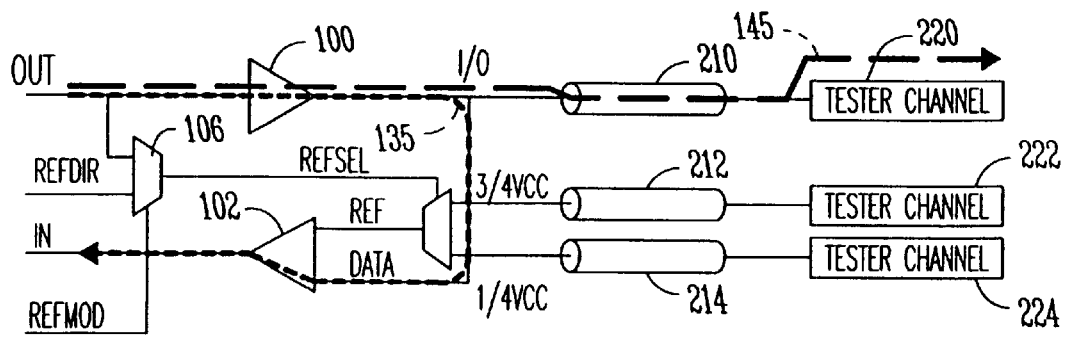
FIG. 10 illustrates a simultaneous bi-directional I/O circuit coupled in a tester loopback test mode, in accordance with one embodiment of the invention.

FIG. 10 illustrates a simultaneous bi-directional I/O circuit coupled in a tester loopback test mode, in accordance with one embodiment of the invention. In this test configuration, the driver 200 of the SBD I/O circuit on the right-hand side of FIG. 9 has been replaced with a tester channel 220. Likewise, the ¾ Vcc and ¼ Vcc reference nodes of the SBD I/O circuit on the right-hand side of FIG. 9 have been replaced by tester channels 222 and 224, respectively.

This test configuration can be operated in two different modes. In one mode, data can be transmitted and received between the SBD I/O circuit on the left-hand side of FIG. 10 and tester channel 220, although not simultaneously. For example, data can be output by the I/O circuit and received by tester channel 220 over path 145.

In another mode, the tester channels can provide a static termination to Vcc or Vss while the SBD I/O circuit is operated in single-pin loopback test mode, as described above regarding FIG. 9. For example, data can be simultaneously sent and received via path 135.

Figure 11:
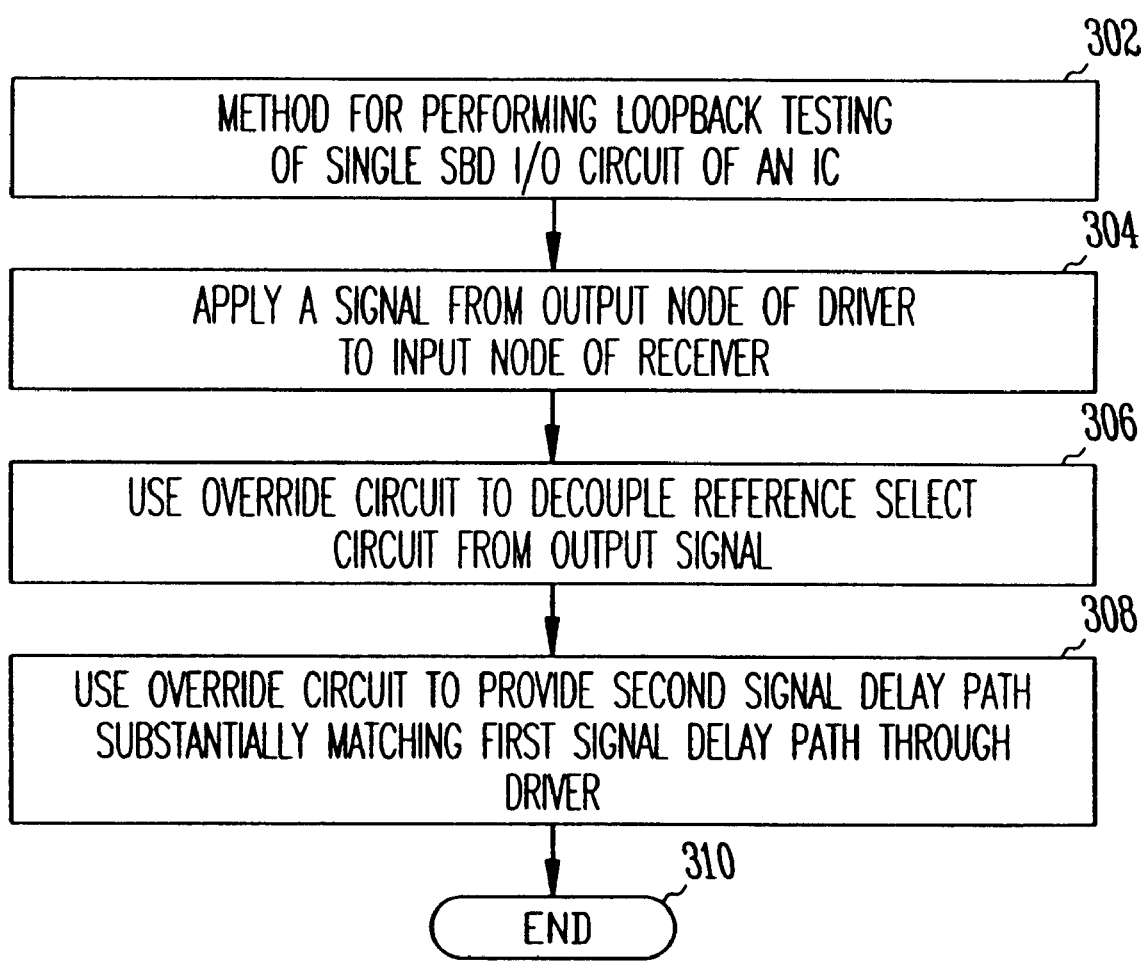
FIG. 11 illustrates a flow diagram of a method of loopback testing a single simultaneous bi-directional I/O circuit, in accordance with one embodiment of the invention.

FIG. 11 illustrates a flow diagram of a method 302 of loopback testing a single simultaneous bi-directional I/O circuit, in accordance with one embodiment of the invention.

In 304, a signal is applied from an output node of a driver of an SBD I/O circuit to an input node of its receiver.

In 306, an override circuit of the SBD I/O circuit is used to decouple the I/O circuit's reference select circuit from an output signal being driven by the driver.

In 308, the override circuit is also used to provide a second signal delay path that substantially matches a first signal delay path through the driver. The method ends in 310.

Figure 12:
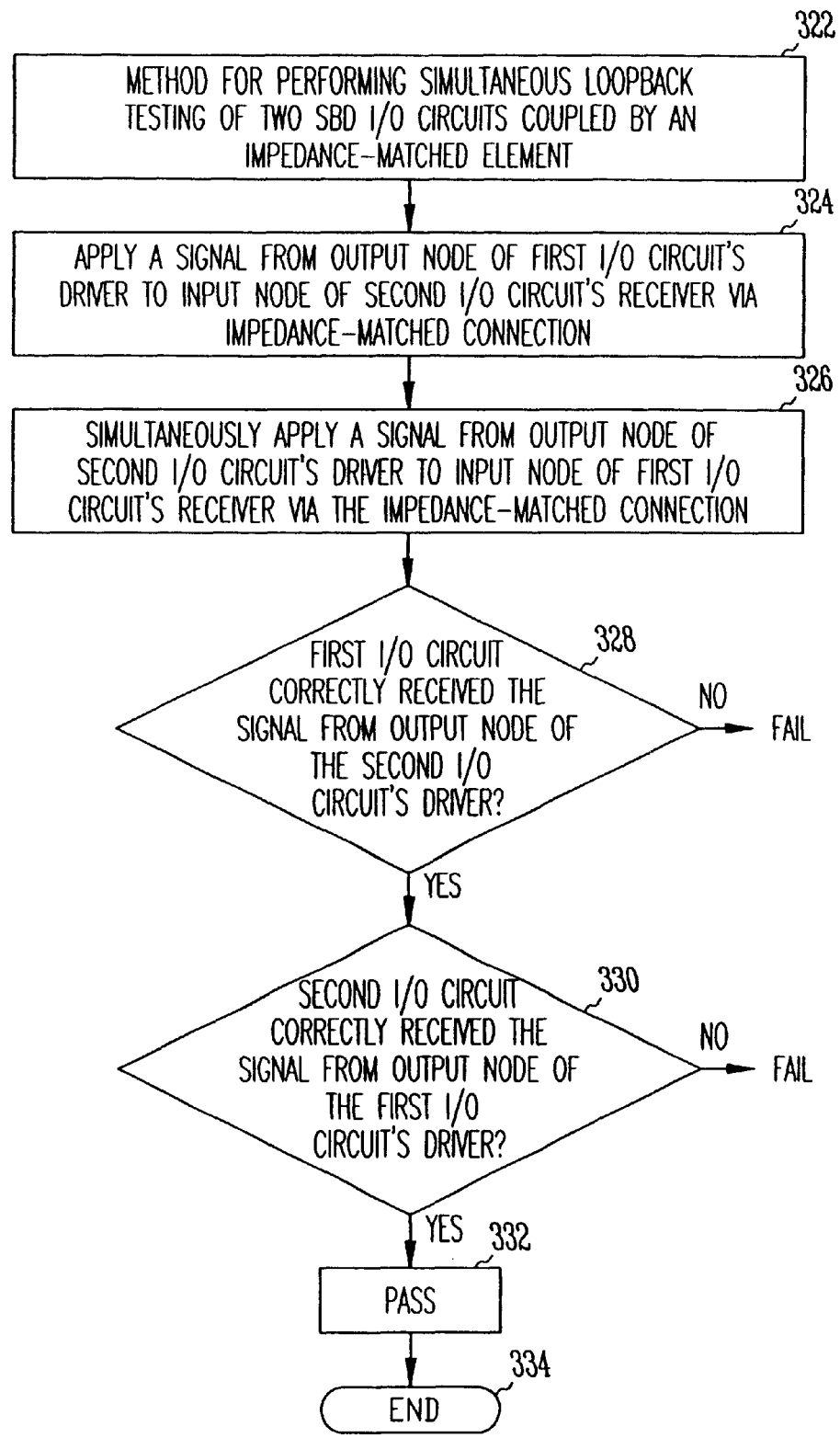
FIG. 12 illustrates a flow diagram of a method of loopback testing a pair of simultaneous bi-directional I/O circuits, in accordance with one embodiment of the invention.

FIG. 12 illustrates a flow diagram of a method 322 of loopback testing a pair of simultaneous bi-directional I/O circuits, in accordance with one embodiment of the invention.

In 324, a signal is applied from an output node of a first SBD I/O circuit's driver to an input node of a second SBD I/O circuit's receiver. The signal is applied via an impedance-matched connection such as a transmission line.

In 326, a signal is simultaneously applied from an output node of the second SBD I/O circuit's driver to an input node of the first SBD I/O circuit's receiver. The signal is applied via an impedance-matched connection such as a transmission line.

In 328, a determination is made whether the first SBD I/O circuit's receiver correctly received the signal from the output node of the second SBD I/O circuit's driver. If so, the method proceeds to 330; else, the test fails.

In 330, a determination is made whether the second SBD I/O circuit's receiver correctly received the signal from the output node of the first SBD I/O circuit's driver. If so, the test passes in 332; else, the test fails. The method ends at 334.

Figure 13:
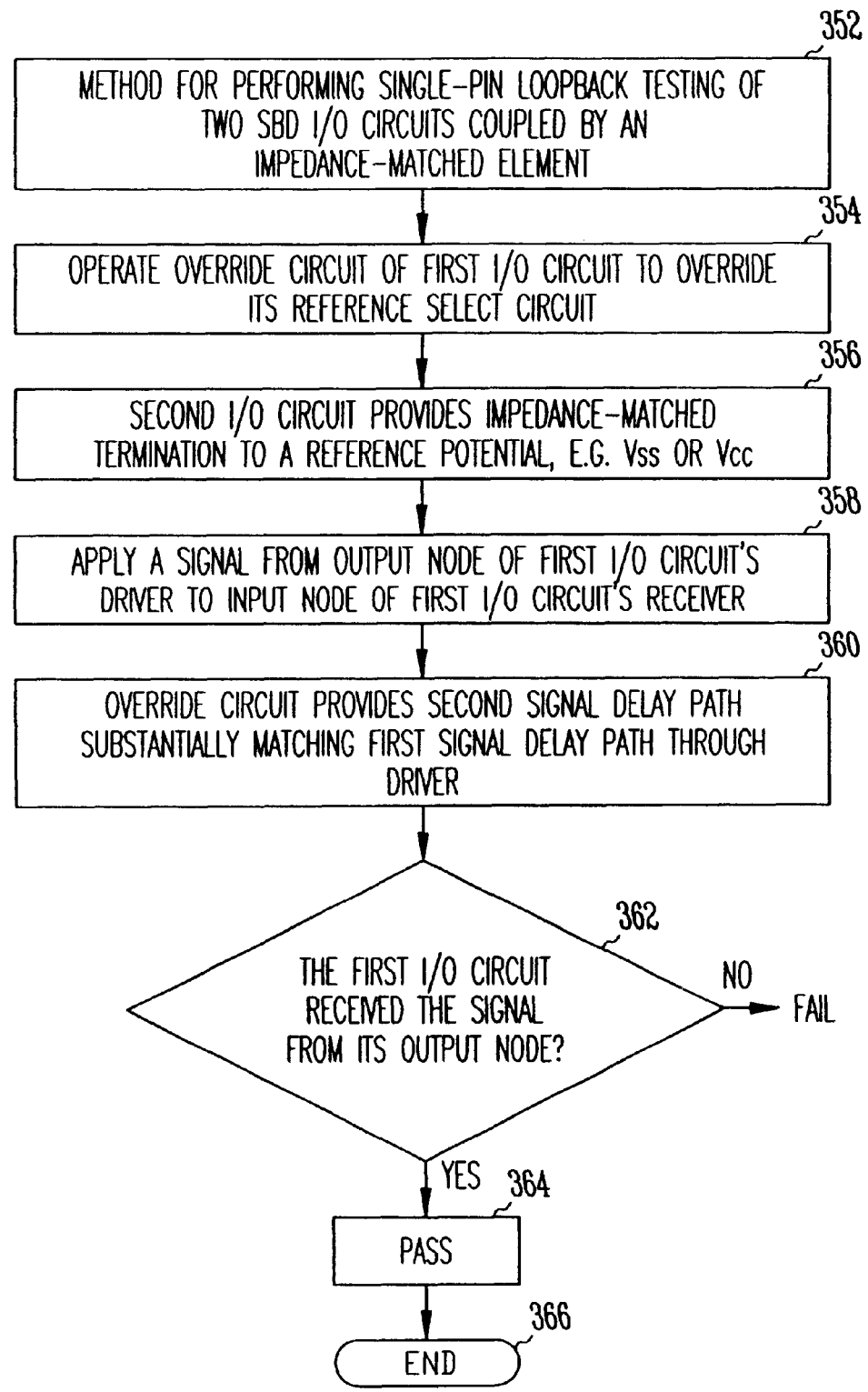
FIG. 13 illustrates a flow diagram of a method of loopback testing a simultaneous bi-directional I/O circuit, in accordance with another embodiment of the invention.

FIG. 13 illustrates a flow diagram of a method 352 of loopback testing a simultaneous bi-directional I/O circuit, in accordance with another embodiment of the invention. This embodiment is referred to as "single-pin" loopback testing.

In 354, the override circuit of a first SBD I/O circuit is operated to override the reference select circuit of the I/O circuit.

In 356, a second SBD I/O circuit is used to provide impedance-matched termination to a reference potential, such as Vss or Vcc.

In 358, a signal is applied from an output node of the first SBD I/O circuit's driver to an input node of the first SBD I/O circuit's receiver.

In 360, the first SBD I/O circuit's override circuit provides a second signal delay path that substantially matches a first signal delay path through the first SBD I/O circuit's driver.

In 362, a determination is made whether the first SBD I/O circuit received the signal from its output node. If so, the test passes at 364; else, it fails. The method ends at 366.

Figure 14:
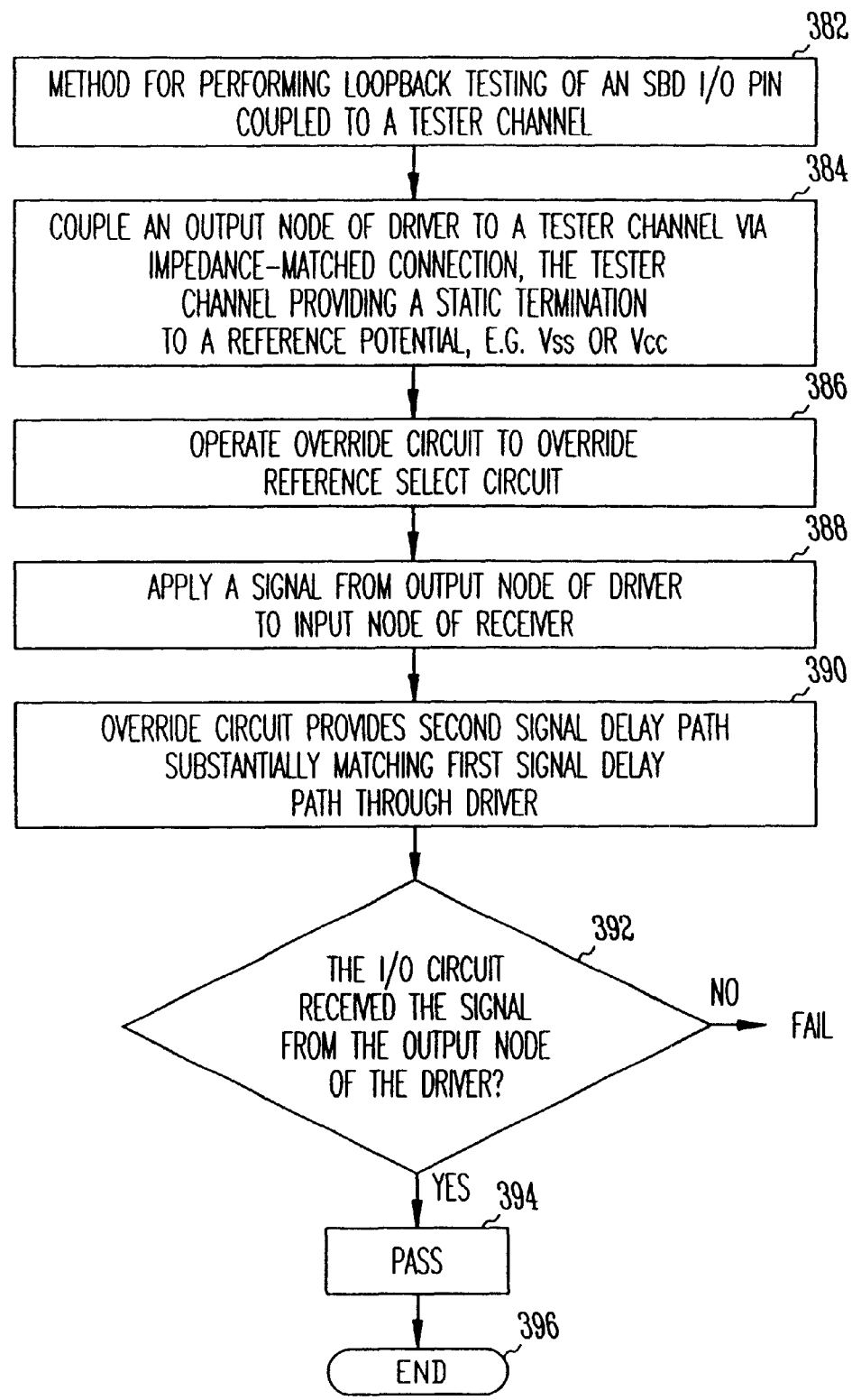
FIG. 14 illustrates a flow diagram of a method of loopback testing a simultaneous bi-directional I/O circuit, in accordance with yet another embodiment of the invention.

FIG. 14 illustrates a flow diagram of a method 382 of loopback testing a simultaneous bi-directional I/O circuit, in accordance with yet another embodiment of the invention. In this embodiment, an SBD I/O circuit is coupled to one or more tester channels.

In 384, an output node of the SBD I/O circuit's driver is coupled to a tester channel via an impedance-matched connection, such as a transmission line. The tester channel provides a static termination to a reference potential such as Vss or Vcc.

In 386, the override circuit of the SBD I/O circuit is operated to override the SBD I/O circuit's reference select circuit.

In 388, a signal from the output node of the SBD I/O circuit's driver is applied to an input node of the SBD I/O circuit's receiver.

In 390, the override circuit is also used to provide a second signal delay path that substantially matches a first signal delay path through the SBD I/O circuit's driver.

In 392, a determination is made whether the SBD I/O circuit received the signal from the output node of its driver. If so, the test passes at 394; else, it fails. The method ends at 396.

The operations described above with respect to the methods illustrated in FIGS. 11 through 14 can be performed in a different order from those described herein.

CONCLUSION

The present invention provides for an SBD I/O circuit that supports loopback testing in native mode. Precise matching of the delays in the data path and the reference select path are provided. The reference select circuitry also switches at a rate that matches the I/O circuit's output slew rate.

The reference override circuit can be built around and incorporate an existing on-chip I/O circuit, so that circuitry that has been compensated for process, voltage, and temperature variations can be used for both normal mode and loopback test mode. This significantly reduces the jitter in the delayed signal in comparison with using uncompensated circuitry.

An electronic system comprising IC's that incorporate the present invention can be tested more economically and quickly and can thus operate with higher quality, so that it is therefore more commercially attractive. The present invention eliminates the need to purchase and deploy expensive high-speed test equipment in high volume manufacturing environments, resulting in more commercially competitive electronic systems.

As shown herein, the present invention can be implemented in a number of different embodiments, including an SBD I/O circuit, an integrated circuit, an electronic system, a data processing system, and several methods for performing loopback testing of an IC. Other embodiments will be readily apparent to those of ordinary skill in the art.

Many variations of the various circuitry appearing in the drawings will be apparent to those skilled in the art having the benefit of this disclosure. For example, the various circuits disclosed herein may be replaced with other circuits of different construction and of different quantity that, taken as a whole, perform the same or similar function. The general functions of the invention may also be performed by significantly different circuitry.

Where a single conductor is illustrated or described, it may be replaced by parallel conductors. Where parallel conductors are illustrated or described, they may be replaced by a single conductor.

In addition to the MUX's disclosed herein, other selection circuits can be used to select between various signals.

The various structures of the present invention may be implemented according to any of various elements and methods known to those skilled in the art. There may be intermediate structure (such as an inverter or buffer) or signals that are between two illustrated structures. Some conductors may not be continuous as illustrated but rather they are broken up by intermediate structure. The borders of boxes in the figures are for illustrative purposes only. An actual device would not have to include such defined boundaries. The relative size and/or layout of the illustrate elements is not to suggest actual relative sizes or layout.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. In an integrated circuit, a simultaneous bi-directional input/output (I/O) circuit comprising:
   a driver responsive to an output signal to generate a data-out signal at an output node;
   a reference select circuit coupled to the output signal;
   a receiver coupled to the reference select circuit and to the output node; and
   an override circuit to override the reference select circuit.

2. The simultaneous bi-directional I/O circuit of claim 1, wherein the override circuit comprises a select circuit responsive to the output signal and to at least one override control signal, and wherein the override circuit is to generate a reference control signal to the reference select circuit.

3. The simultaneous bi-directional I/O circuit of claim 2, wherein the select circuit comprises a multiplexer having input terminals responsive to the output signal and to a reference direction control signal, having a control terminal responsive to a reference mode signal, and to generate the reference control signal at its output terminal.

4. The simultaneous bi-directional I/O circuit of claim 1, wherein an output signal passing through the driver to the output node has a first delay path, and wherein an output signal passing through the override circuit and the reference select circuit has a second delay path substantially matching the first delay path.

5. The simultaneous bi-directional I/O circuit of claim 1 and further comprising:
   a delay-matching circuit to equalize a first signal delay path through the driver with a second signal delay path through the override circuit and the reference select circuit.

6. The simultaneous bi-directional I/O circuit of claim 5, wherein the delay-matching circuit comprises a pair of multiplexers, which are responsive to the output signal and to its complement, respectively.

7. The simultaneous bi-directional I/O circuit of claim 6, wherein a first multiplexer of the pair of multiplexers is to contribute to the first signal delay path when the output signal is in a first state, and wherein a second multiplexer of the pair of multiplexers is to contribute to the first signal delay path when the output signal is in a second state.

8. An electronic system having a plurality of simultaneous bi-directional input/output (I/O) circuits, each comprising:
   a driver responsive to an output signal to generate a data-out signal at an output node;
   a reference select circuit coupled to the output signal;
   a receiver coupled to the reference select circuit and to the output node; and
   an override circuit to override the reference select circuit.

9. The electronic system of claim 8, wherein the override circuit comprises a select circuit responsive to the output signal and to at least one override control signal, and wherein the override circuit is to generate a reference control signal to the reference select circuit.

10. The electronic system of claim 9, wherein the select circuit comprises a multiplexer having input terminals responsive to the output signal and to a reference direction control signal, having a control terminal responsive to a reference mode signal, and to generate the reference control signal at its output terminal.

11. The electronic system of claim 8, wherein an output signal passing through the driver to the output node has a first delay path, and wherein an output signal passing through the override circuit and the reference select circuit has a second delay path substantially matching the first delay path.

12. A data processing system comprising:
- a plurality of components;
- a bus coupling the components; and
- wherein at least one component includes a plurality of simultaneous bi-directional input/output circuits, each comprising:
  - a driver responsive to an output signal to generate a data-out signal at an output node;
  - a reference select circuit coupled to the output signal;
  - a receiver coupled to the reference select circuit and to the output node; and
  - an override circuit to override The reference select circuit.

13. The data processing system of claim 12, wherein the override circuit comprises a select circuit responsive to the output signal and to at least one override control signal, and wherein the override circuit is to generate a reference control signal to the reference select circuit.

14. The data processing system of claim 13, wherein the select circuit comprises a multiplexer having input terminals responsive to the output signal and to a reference direction control signal, having a control terminal responsive to a reference mode signal, and to generate the reference control signal at its output terminal.

15. The data processing system of claim 12, wherein an output signal passing through the driver to the output node has a first delay path, and wherein an output signal passing through the override circuit and the reference select circuit has a second delay path substantially matching the first delay path.

16. The data processing system of claim 12, wherein the components are selected from the group consisting of a processor, chipset logic, and an external memory.

* * * * *